(12) United States Patent
Takahashi et al.

(10) Patent No.: US 8,683,855 B2
(45) Date of Patent: Apr. 1, 2014

(54) COMPETENCE DIAGNOSIS SYSTEM FOR UREA WATER TEMPERATURE SENSOR

(75) Inventors: Hirotaka Takahashi, Fujisawa (JP);
Yoshinori Hamaguchi, Fujisawa (JP);
Takanobu Ogawa, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 13/697,936

(22) PCT Filed: May 16, 2011

(86) PCT No.: PCT/JP2011/061207
§ 371 (c)(1),
(2), (4) Date: Nov. 14, 2012

(87) PCT Pub. No.: WO2011/145569
PCT Pub. Date: Nov. 24, 2011

(65) Prior Publication Data
US 2013/0055802 A1 Mar. 7, 2013

(30) Foreign Application Priority Data

May 17, 2010 (JP) ................................ 2010-113759

(51) Int. Cl.
*G01M 15/00* (2006.01)
(52) U.S. Cl.
USPC ...................................................... 73/114.68
(58) Field of Classification Search
USPC ............................. 73/114.68, 114.69, 114.77
See application file for complete search history.

(56) References Cited

U.S. PATENT DOCUMENTS

| 7,685,810 | B2* | 3/2010 | Hirata et al. ..................... 60/277 |
| 8,276,373 | B2* | 10/2012 | Wang et al. ..................... 60/295 |
| 2009/0139318 | A1* | 6/2009 | Zemskova et al. ......... 73/114.69 |
| 2010/0050603 | A1 | 3/2010 | Seino et al. |
| 2013/0055803 | A1* | 3/2013 | Takahashi et al. ......... 73/114.75 |
| 2013/0061949 | A1* | 3/2013 | Minezawa et al. ............ 137/334 |

FOREIGN PATENT DOCUMENTS

| JP | 2000-303826 | 10/2000 |
| JP | 2010-19134 | 1/2010 |
| JP | 2010-59963 | 3/2010 |
| JP | 2010-65581 | 3/2010 |

OTHER PUBLICATIONS

Written Opinion of the International Searching Authority mailed Jul. 19, 2011 in corresponding International Application No. PCT/JP2011/061207.
Patent Abstracts of Japan, Publication No. 2000-303826, Published Oct. 31, 2000.
Patent Abstracts of Japan, Publication No. 2010-019134, Published Jan. 28, 2010.

(Continued)

*Primary Examiner* — Freddie Kirkland, III
(74) *Attorney, Agent, or Firm* — Staas & Halsey LLP

(57) ABSTRACT

A competence diagnosis system for a urea water temperature sensor that can limit a diagnosis during a cold start. The system includes a cold start condition determination unit that obtains a difference between an engine cooling water temperature and an ambient temperature, a difference between an engine cooling water temperature and a fuel temperature, and a difference between an ambient temperature and a fuel temperature by using an engine cooling water temperature, an ambient temperature, and a fuel temperature measured immediately after engine starting, and allows a diagnosis by the competence diagnosis unit when the temperature differences are less than or equal to a predetermined threshold value.

4 Claims, 3 Drawing Sheets

(56) References Cited

OTHER PUBLICATIONS

Patent Abstracts of Japan, Publication No. 2010-059963, Published Mar. 18, 2010.

Patent Abstracts of Japan, Publication No. 2010-065581, Published Mar. 25, 2010.

International Search Report of PCT/JP2011/061207 mailed Jul. 19, 2011.

* cited by examiner

COMPETENCE DIAGNOSIS SYSTEM FOR UREA WATER TEMPERATURE SENSOR

CROSS-REFERENCE TO RELATED APPLICATIONS

This application claims the foreign priority benefit of Japanese Application No. 2010-113759 filed May 17, 2010, the contents of which are incorporated herein by reference, which serves as priority for PCT Application No. JP2011/061207 filed May 16, 2011.

TECHNICAL FIELD

The present invention relates to a competence diagnosis system for a urea water temperature sensor that diagnoses a failure of the urea water temperature sensor for measuring a temperature of urea water stored in a urea tank.

BACKGROUND ART

As an exhaust gas purification system for purifying NOx in exhaust gas of a diesel engine, an SCR (Selective Catalytic Reduction) system using an SCR device has been developed.

The SCR system supplies urea water to an exhaust gas upstream of SCR, generates ammonia by the heat of the exhaust gas, and reduces and purifies NOx on an SCR catalyst by the ammonia (see, for example, Patent Document 1).

In the SCR system, a temperature of urea water stored in a urea tank is measured by a urea water temperature sensor provided in the urea tank. Thus, freezing of the urea water is detected, and thawing control is performed as necessary.

Since the temperature of the urea water cannot be measured when the urea water temperature sensor fails, the SCR system includes a competence diagnosis system for a urea water temperature sensor that diagnoses a failure of the urea water temperature sensor.

The competence diagnosis system diagnoses a failure of the urea water temperature sensor by comparing a temperature of the urea water measured by the urea water temperature sensor with an ambient temperature. Specifically, the competence diagnosis system compares a temperature of the urea water with an ambient temperature immediately after engine starting, and diagnoses the urea water temperature sensor as failed when a difference between the temperatures is more than a predetermined threshold value. Since there is no temperature sensor that directly measures an ambient temperature to be compared, for example, an intake manifold temperature or an MAF (Mass Air Flow) temperature measured by an MAF temperature sensor provided in an MAF sensor is used as the ambient temperature.

The reason for performing the diagnosis immediately after the engine starting is that it is expected that a temperature of the urea water in the urea tank and an ambient temperature would be substantially the same immediately after the engine starting, and a failure of the urea water temperature sensor can be diagnosed by determining whether or not there is a significant difference between these temperatures.

In the conventional competence diagnosis system, the diagnosis is allowed in only a predetermined period after the engine starting so that the diagnosis is performed only immediately after the engine starting.

PRIOR ART DOCUMENTS

Patent Documents

Patent Document 1: Japanese Patent Application Publication No. 2000-303826

DISCLOSURE OF THE INVENTION

Problems to be Solved by the Invention

However, even immediately after the engine starting, when engine starting and stopping is repeated within a short time, the temperature of the urea water inside the urea tank rises according to an engine temperature rise after the previous engine starting, so that the measurement value of the urea water temperature sensor becomes significantly different from the ambient temperature. In this manner, there is a problem in that, when the engine starting is not a cold start performed with the engine cooled, the conventional competence diagnosis system diagnoses the urea water temperature sensor as failed even when the urea water temperature sensor has not failed.

Therefore, an object of the present invention is to provide a competence diagnosis system for a urea water temperature sensor that can prevent a misdiagnosis by limiting a diagnosis during a cold start.

Means for Solving the Problems

The present invention has been made in order to achieve the above object, and an invention of claim 1 is a competence diagnosis system for a urea water temperature sensor including a competence diagnosis unit that diagnoses a failure of the urea water temperature sensor provided in a urea tank by comparing a temperature of urea water measured by the urea water temperature sensor with an ambient temperature, characterized in that the competence diagnosis system for a urea water temperature sensor includes a cold start condition determination unit that obtains a difference between an engine cooling water temperature and an ambient temperature, a difference between an engine cooling water temperature and a fuel temperature, and a difference between an ambient temperature and a fuel temperature by using an engine cooling water temperature, an ambient temperature, and a fuel temperature measured immediately after engine starting, and allows a diagnosis by the competence diagnosis unit when the temperature differences are less than or equal to a predetermined threshold value.

An invention of claim 2 is the competence diagnosis system for a urea water temperature sensor according to claim 1, wherein the cold start condition determination unit allows the diagnosis by the competence diagnosis unit when the engine cooling water temperature is in a predetermined range.

An invention of claim 3 is the competence diagnosis system for a urea water temperature sensor according to claim 1 or 2, wherein minimum values among temperatures measured after the engine starting are used as the engine cooling water temperature and the ambient temperature.

Effects of the Invention

According to the present invention, a misdiagnosis can be prevented by limiting a diagnosis during a cold start.

BEST MODES FOR CARRYING OUT THE INVENTION

Hereinafter, preferred embodiments of the present invention will be described with reference to the accompanying drawings.

First, an SCR system mounted on a vehicle will be described.

Figure 1:
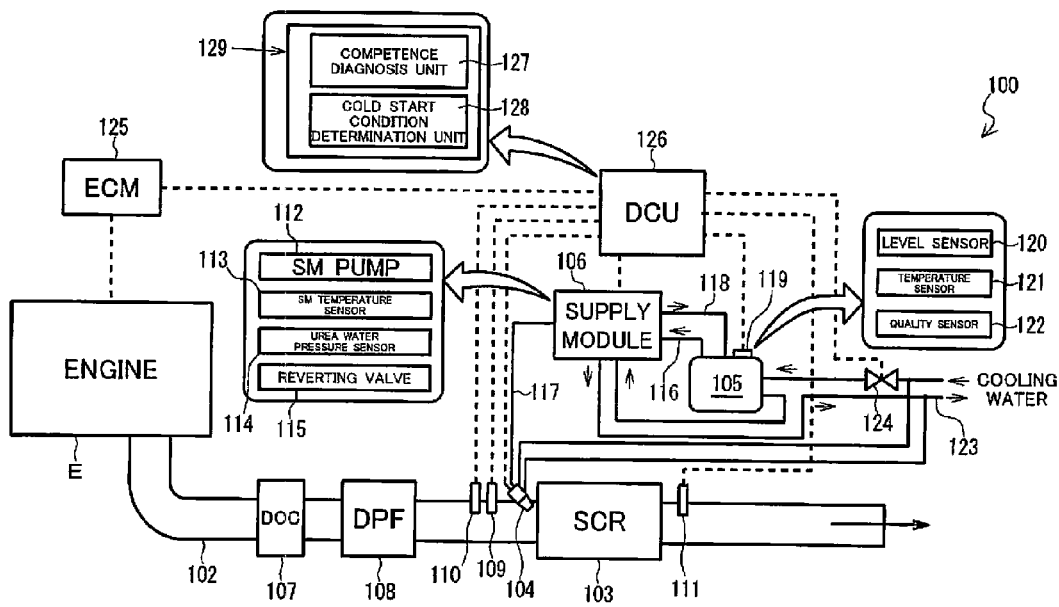
FIG. 1 is a schematic view showing an SCR system to which the present invention is applied.

As shown in FIG. 1, an SCR system 100 mainly includes an SCR device 103 provided at an exhaust pipe 102 of an engine E, a dosing valve (urea injection device, dosing module) 104 for injecting urea water on an upstream side of the SCR device 103 (upstream side of exhaust gas), a urea tank 105 for storing urea water, a supply module 106 for supplying the urea water stored in the urea tank 105 to the dosing valve 104, and a DCU (Dosing Control Unit) 126 for controlling the dosing valve 104, the supply module 106, and the like.

At the exhaust pipe 102 of the engine E, a DOC (Diesel Oxidation Catalyst) 107, a DPF (Diesel Particulate Filter) 108, and the SCR device 103 are sequentially arranged from the upstream side to the downstream side of exhaust gas. The DOC 107 generates $NO_2$ by oxidating NO in exhaust gas exhausted from the engine E, and increases a denitrification efficiency in the SCR device 103 by controlling a ratio of NO to $NO_2$ in the exhaust gas. Further, the DPF 108 traps a Particulate Matter (PM) in the exhaust gas.

The dosing valve 104 is provided at the exhaust pipe 102 on the upstream side of the SCR device 103. The dosing valve 104 is configured such that an injection nozzle is provided at a cylinder filled with high-pressure urea water, and a valve body plugging the injection nozzle is attached to a plunger. By pulling up the plunger by electrifying a coil, the valve body is separated from the injection nozzle, so that the urea water is injected. When electrifying the coil is stopped, the plunger is pulled down by an internal spring force and thus the valve body plugs the injection nozzle, so that the injection of the urea water is stopped.

An exhaust gas temperature sensor 109 for measuring a temperature of the exhaust gas in an inlet of the SCR device 103 (SCR inlet temperature) is provided at the exhaust pipe 102 on an upstream side of the dosing valve 104. Further, an upstream side NOx sensor 110 for detecting an NOx concentration in the upstream side of the SCR device 103 is provided on the upstream side of the SCR device 103 (herein, an upstream side of the exhaust gas temperature sensor 109), and a downstream side NOx sensor 111 for detecting an NOx concentration in the downstream side of the SCR device 103 is provided on the downstream side of the SCR device 103.

The supply module 106 includes an SM pump 112 for pumping the urea water, an SM temperature sensor 113 for measuring a temperature of the supply module 106 (temperature of the urea water flowing through the supply module 106), a urea water pressure sensor 114 for measuring a pressure of the urea water in the supply module 106 (pressure in a discharge side of the SM pump 112), and a reverting valve 115 for switching a flow passage of the urea water to switch whether or not to supply the urea water from the urea tank 105 to the dosing valve 104 or return the urea water inside the dosing valve 104 to the urea tank 105. Herein, when the reverting valve 115 is turned on, the urea water from the urea tank 105 is supplied to the dosing valve 104; and when the reverting valve 115 is turned off, the urea water inside the dosing valve 104 is returned to the urea tank 105.

When the reverting valve 115 is switched to supply the urea water to the dosing valve 104, the supply module 106 suctions the urea water inside the urea tank 105 by the SM pump 112 through a liquid feed line (suction line) 116, supplies the urea water to the dosing valve 104 through a pump line (pressure line) 117, and returns surplus urea water to the urea tank 105 through a recovery line (back line) 118.

The urea tank 105 is provided with an SCR sensor 119. The SCR sensor 119 includes a level sensor 120 for measuring a liquid surface height (level) of the urea water inside the urea tank 105, a temperature sensor 121 for measuring a temperature of the urea water inside the urea tank 105, and a quality sensor 122 for measuring a quality of the urea water inside the urea tank 105. The quality sensor 122 detects the quality of the urea water inside the urea tank 105 by detecting the concentration of the urea water or detecting whether or not a heterogeneous mixture is mixed in the urea water, for example, from a propagation speed of an ultrasonic wave or an electrical conductivity.

A cooling line 123 for circulating cooling water for cooling the engine E (engine cooling water) is connected to the urea tank 105 and the supply module 106. The cooling line 123 performs heat exchange between the cooling water flowing through the urea tank 105 into the cooling line 123 and the urea water inside the urea tank 105. Likewise, the cooling line 123 performs heat exchange between the cooling water flowing through the supply module 106 into the cooling line 123 and the urea water inside the supply module 106.

The cooling line 123 is provided with a tank heater valve (coolant valve) 124 for switching whether or not to supply the cooling water to the urea tank 105 and the supply module 106. In addition, although the cooling line 123 is also connected to the dosing valve 104, the cooling water is supplied to the dosing valve 104 regardless of the on/off of the tank heater valve 124. In addition, although not shown in FIG. 1 for simplicity, the cooling line 123 is disposed along the liquid feed line 116, the pump line 117, and the recovery line 118 through which the urea water flows.

Figure 2:
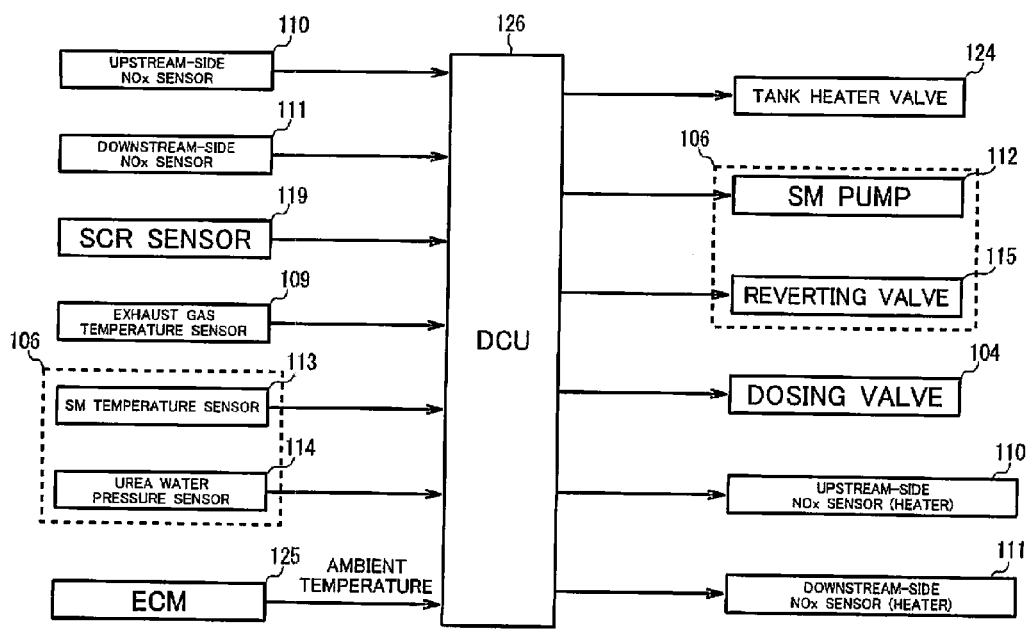
FIG. 2 is a diagram showing an input/output configuration of a DCU.

FIG. 2 shows an input/output configuration diagram of the DCU 126.

As shown in FIG. 2, an input signal line from an ECM (Engine Control Module) 125 controlling the upstream side NOx sensor 110, the downstream side NOx sensor 111, the SCR sensor 119 (level sensor 120, temperature sensor 121, quality sensor 122), the exhaust gas temperature sensor 109, the SM temperature sensor 113 and the urea water pressure sensor 114 of the supply module 106, and the engine E is connected to the DCU 126. Signals of the ambient temperature and engine parameters (the number of rotations of the engine, and the like) are input from the ECM 125.

Further, output signal lines to the tank heater valve 124, the SM pump 112 and the reverting valve 115 of the supply module 106, the dosing valve 104, a heater of the upstream side NOx sensor 110, and a heater of the downstream side NOx sensor 111 are connected to the DCU 126. Further, the input/output of signals between the DCU 126 and the respective members may be any one of the input/output through separate signal lines and the input/output through a CAN (Controller Area Network).

The DCU 126 estimates an amount of NOx in the exhaust gas based on the engine parameter signals from the ECM 125 and the temperature of the exhaust gas from the exhaust gas temperature sensor 109, and determines an amount of urea water to be injected from the dosing valve 104 based on the estimated amount of NOx in the exhaust gas. In addition, when the determined amount of urea water is injected by the dosing valve 104, the DCU 126 controls the dosing valve 104 based on the detection value of the upstream side NOx sensor 110 to adjust the amount of urea water to be injected from the dosing valve 104.

In the SCR system 100, a temperature of the urea water stored in the urea tank 105 is measured by a urea water temperature sensor (in this embodiment, the temperature sensor 121 provided in the SCR sensor 119), and thawing control is performed as necessary when freezing of the urea water is detected. Since the temperature of the urea water cannot be measured when the temperature sensor 121 as the urea water temperature sensor fails, the SCR system 100 includes a competence diagnosis system for a urea water temperature sensor (hereinafter, simply referred to as a competence diagnosis system) 129 that diagnoses a failure of the temperature sensor 121.

The competence diagnosis system 129 includes a competence diagnosis unit 127 that diagnoses a failure of the temperature sensor 121 by comparing a temperature of the urea water measured by the temperature sensor 121 with an ambient temperature. The competence diagnosis unit 127 is mounted in the DCU 126.

The competence diagnosis unit 127 confirms no abnormality related to an engine cooling water temperature (coolant temperature), an ambient temperature, and a fuel temperature, no abnormality related to the level sensor 120 measuring a level of the urea water, and no circuit abnormality of the temperature sensor 121, which are data transmitted from the ECM 125 through the CAN (CAN data), and determines whether it is immediately after engine starting, based on a battery voltage being a parameter included in the DCU 126 and a lapse time measured by an engine run timer. Herein, the engine run timer is used to measure a lapse time after the engine starting. For example, when an engine rpm (revolutions per minute) becomes more than or equal to a predetermined rpm, the engine run timer determines it as engine starting and starts to count, and when the engine rpm becomes less than or equal to the predetermined rpm (for example, 25 rpm), the engine run timer resets the count.

Further, since there is no temperature sensor that directly measures an ambient temperature, for example, an intake manifold temperature or an MAF (Mass Air Flow) temperature measured by an MAF temperature sensor provided in an MAF sensor is used as the ambient temperature.

When determining that it is immediately after the engine starting, the competence diagnosis unit 127 compares the temperature of the urea water obtained by the temperature sensor 121 with the ambient temperature. Further, when determining that it is not immediately after the engine starting, the competence diagnosis unit 127 does not diagnose a failure of the temperature sensor 121.

As a result of the comparison of the urea water temperature with the ambient temperature, when a difference between the temperatures is more than a predetermined threshold value, the competence diagnosis unit 127 diagnoses the temperature sensor 121 as failed.

The competence diagnosis system 129 diagnoses a failure of the temperature sensor 121 in this way. However, as mentioned in "PROBLEMS TO BE SOLVED BY THE INVENTION", there is a problem in that, when engine starting and stopping is repeated within a short time, an accurate failure diagnosis cannot be achieved solely by determining whether it is immediately after the engine starting, based on the battery voltage and the engine run timer. This problem can be avoided by limiting the diagnosis into a cold start mode (starting with the engine cooled).

Therefore, the present inventors provided the competence diagnosis system 129 with a cold start condition determination unit 128 that obtains a difference between the engine cooling water temperature and the ambient temperature, a difference between the engine cooling water temperature and the fuel temperature, and a difference between the ambient temperature and the fuel temperature by using the engine cooling water temperature, the ambient temperature, and the fuel temperature measured immediately after the engine starting, and allows the diagnosis by the competence diagnosis unit 127 by determining that the engine starting is a cold start, when the temperature differences are less than or equal to the predetermined threshold value.

The cold start condition determination unit 128 obtains a difference between the engine cooling water temperature and the ambient temperature after key-on, a difference between the engine cooling water temperature and the fuel temperature after the key-on, and a difference between the ambient temperature and the fuel temperature after the key-on, determines whether or not the temperature differences are less than or equal to the predetermined threshold value, and confirms that there is no variation in the respective temperature differences. In this manner, by confirming a variation of the temperature difference by a plurality of parameters, the cold start condition determination unit 128 can perform more accurate determination (can more certainly determine whether the engine starting is a cold start). The engine cooling water temperature, the ambient temperature, and the fuel temperature used in this determination are measured by the respective temperature sensors at predetermined periods after the engine starting. These temperatures are transmitted from the ECM 125 to the DCU 126 through the CAN, and are used by the competence diagnosis system 129. Herein, in order to minimize an influence on the cold start condition determination result, the minimum values among the temperatures measured after the engine starting may be used as the engine cooling water temperature and the ambient temperature.

By this determination, it is possible to confirm that there is no variation in the measurement values of the respective temperature sensors. However, when these measurement values are in a range that is impossible in a natural environment, since it cannot be considered to be a cold start, it is necessary to exclude this case.

Therefore, when confirming that there is no variation in the respective temperature differences, the cold start condition determination unit 128 determines whether or not any of the engine cooling water temperature, the ambient temperature, and the fuel temperature is in a predetermined range. By these determinations, the cold start can be detected more certainly.

Figure 3:
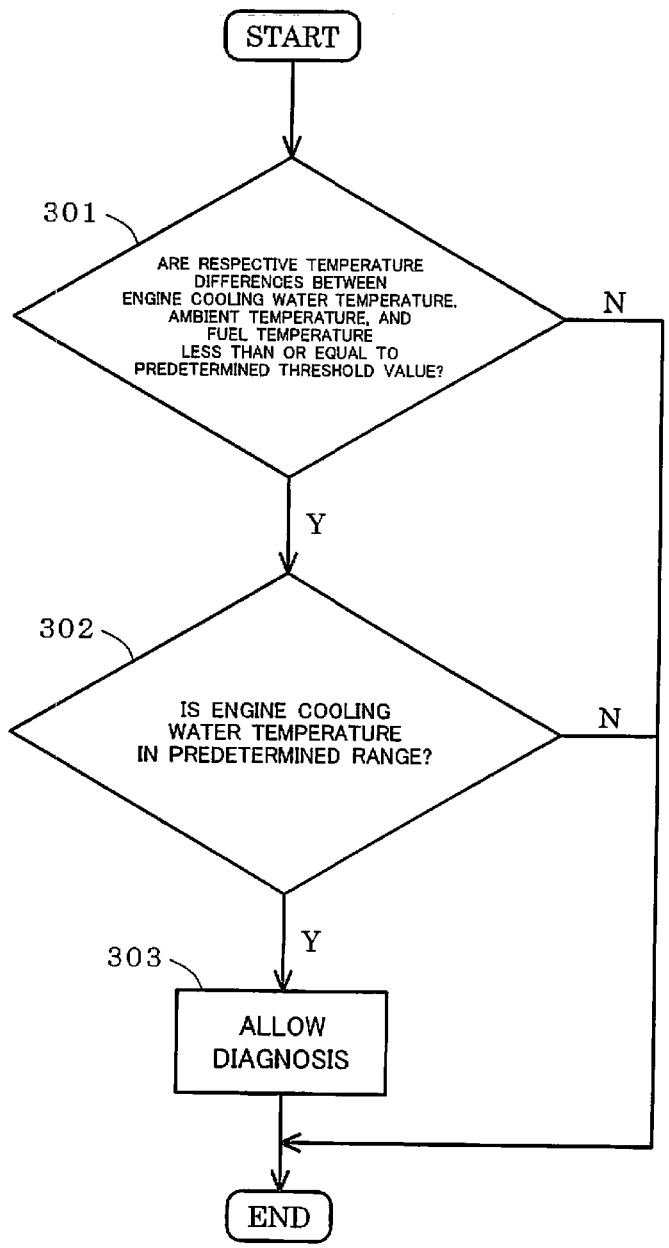
FIG. 3 is a flowchart illustrating an operation of a cold start condition determination unit in a competence diagnosis system for a urea water temperature sensor according to one embodiment of the present invention.

FIG. 3 shows a flowchart summarizing the operation of the cold start condition determination unit 128.

As shown in FIG. 3, the cold start condition determination unit 128 obtains a difference between an engine cooling water temperature and an ambient temperature, a difference between an engine cooling water temperature and a fuel temperature, and a difference between an ambient temperature and a fuel temperature by using an engine cooling water temperature, an ambient temperature, and a fuel temperature measured by the respective sensors immediately after engine starting (after key-on), and determines whether or not the temperature differences are less than or equal to a predetermined threshold value (step 301). Specifically, the cold start condition determination unit 128 determines whether an absolute value of a difference between a minimum value of the engine cooling water temperature after the key-on and a minimum value of the ambient temperature after the key-on, an absolute value of a difference between a minimum value of the engine cooling water temperature after the key-on and the fuel temperature, and an absolute value of a difference between a minimum value of the ambient temperature after the key-on and the fuel temperature are less than or equal to the threshold value.

When determining in step 301 that the respective temperature differences are more than the predetermined threshold value, the cold start condition determination unit 128 does not allow the diagnosis and ends the determination of the diagnosis allowance condition.

Further, when determining in step 301 that the respective temperature differences are less than or equal to the predetermined threshold value, the cold start condition determination unit 128 determines whether or not the engine cooling water temperature is in a predetermined range (step 302). Further, the determination of step 302 may be performed according to whether or not the ambient temperature and the fuel temperature (in addition to the engine cooling water temperature) are in a predetermined range.

When determining in step 302 that the engine cooling water temperature is out of the predetermined range, the cold start condition determination unit 128 does not allow the diagnosis and ends the determination of the diagnosis allowance condition.

Further, when determining in step 302 that the engine cooling water temperature is in the predetermined range, the cold start condition determination unit 128 allows the diagnosis (step 303).

By this operation, the cold start condition determination unit 128 can certainly determine whether or not the engine starting is a cold start.

An operation of the competence diagnosis system for a urea water temperature sensor 129 including the cold start condition determination unit 128 will be described with reference to FIG. 4.

The competence diagnosis unit 127 included in the competence diagnosis system 129 confirms no abnormality related to an engine cooling water temperature, an ambient temperature, and a fuel temperature, no abnormality related to the level sensor 120 measuring a level of the urea water, and no circuit abnormality of the temperature sensor 121, which are CAN data (step 400), and ends the diagnosis when there is an abnormality in any one.

When confirming in step 400 that there is no abnormality, the competence diagnosis unit 127 determines whether or not a battery voltage being a parameter included in the DCU 126 is in a predetermined range (step 401).

When determining in step 401 that the battery voltage is out of the predetermined range, the competence diagnosis unit 127 does not diagnose the temperature sensor 121 and ends the process.

Further, when determining in step 401 that the battery voltage is in the predetermined range, the competence diagnosis unit 127 determines whether or not a lapse time measured by the engine run timer is in a predetermined range (step 402).

When determining in step 402 that the lapse time measured by the engine run timer is out of the predetermined range, the competence diagnosis unit 127 does not diagnose the temperature sensor 121 and ends the process.

Further, when determining in step 402 that the lapse time measured by the engine run timer is in the predetermined range, the competence diagnosis unit 127 determines whether or not a cold start condition is satisfied by the cold start condition determination unit 128 according to the flowchart shown in FIG. 3 (step 403).

When determining in step 403 that the cold start condition is satisfied by the cold start condition determination unit 128, the competence diagnosis unit 127 compares a urea water temperature obtained by the temperature sensor 121 with a minimum value among ambient temperatures measured within a predetermined time after the establishment of the cold start condition (step 404). Herein, using the minimum value among the ambient temperatures measured within the predetermined time after the establishment of the cold start condition is to minimize an influence on the diagnosis result. That is, when a car has started to run during the diagnosis, there is a possibility that an intake manifold temperature or an MAF temperature as an ambient temperature will rise, thus significantly influencing the diagnosis result. However, by using the minimum value, these influences can be eliminated.

When determining in step 404 that a difference between the urea water temperature and the ambient temperature is less than or equal to a predetermined threshold value, the competence diagnosis unit 127 determines that the temperature sensor 121 is normal (step 405).

When determining in step 404 that the difference between the urea water temperature and the ambient temperature is more than the predetermined threshold value, the competence diagnosis unit 127 determines that the temperature sensor 121 is failed (step 406). Further, the determination of a failure may be performed first when these steps are repeated and a failure determination is made successively a plurality of times.

In this manner, the competence diagnosis system 129 of the present invention determines whether or not the cold start condition is satisfied by the cold start condition determination unit 128, in addition to the conventional diagnosis allowance condition of steps 401 and 402. Therefore, the cold start can be certainly detected, and the diagnosis can be limited during the cold start.

Accordingly, it is possible to prevent a misdiagnosis that diagnoses the temperature sensor 121 as failed even when the temperature sensor 121 has not failed, because the temperature difference between the ambient temperature and the urea water temperature obtained by the temperature sensor 121 increases when engine starting and stopping is repeated.

EXPLANATION OF REFERENCE NUMERALS

Figure 4:
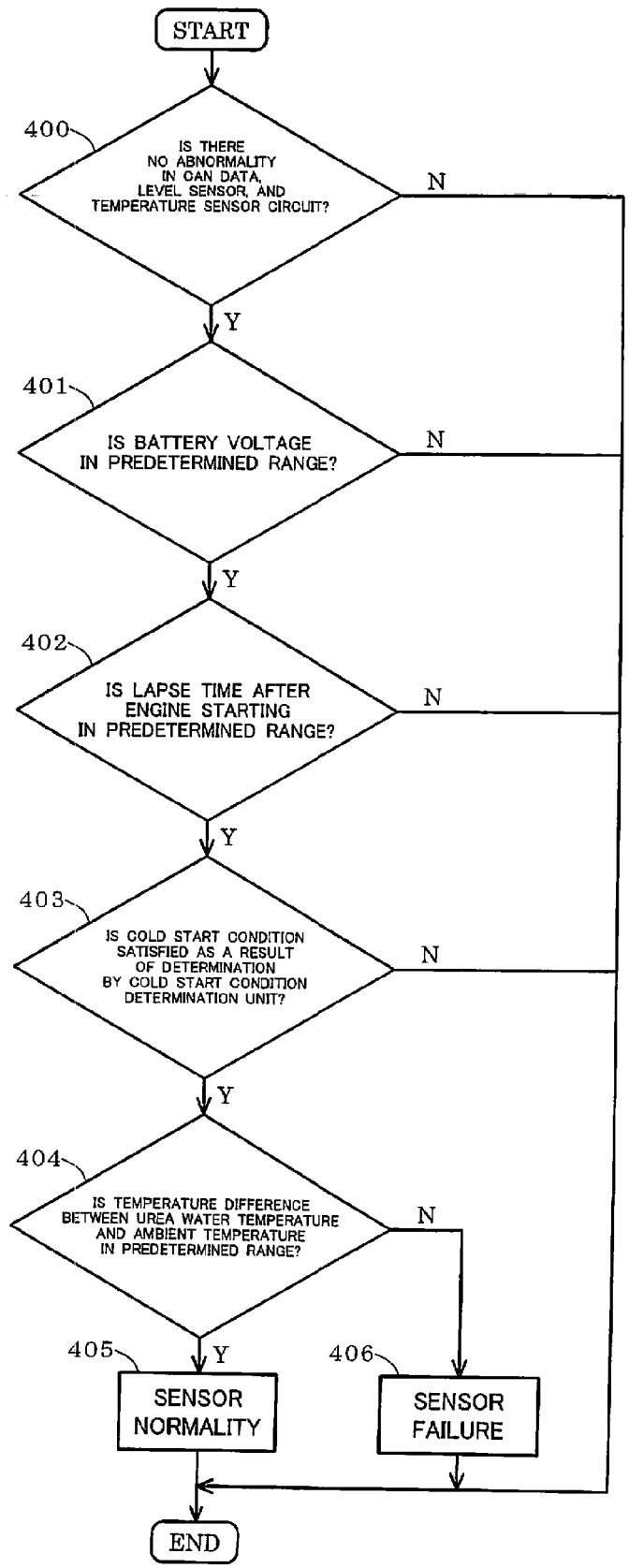
FIG. 4 is a flowchart illustrating an operation of the competence diagnosis system for a urea water temperature sensor including the cold start condition determination unit.

105 Urea tank
121 Urea water temperature sensor
127 Competence diagnosis unit
128 Cold start condition determination unit
129 Competence diagnosis system for urea water temperature sensor
FIG. 1
106 SUPPLY MODULE
112 SM PUMP
113 SM TEMPERATURE SENSOR
114 UREA WATER PRESSURE SENSOR
115 REVERTING VALVE
120 LEVEL SENSOR
121 TEMPERATURE SENSOR 122 QUALITY SENSOR
127 COMPETENCE DIAGNOSIS UNIT
128 COLD START CONDITION DETERMINATION UNIT
E ENGINE
COOLING WATER
FIG. 2
104 DOSING VALVE
109 EXHAUST GAS TEMPERATURE SENSOR
110 UPSTREAM-SIDE NOx SENSOR
110 UPSTREAM-SIDE NOx SENSOR (HEATER)
111 DOWNSTREAM-SIDE NOx SENSOR
111 DOWNSTREAM-SIDE NOx SENSOR (HEATER)
112 SM PUMP
113 SM TEMPERATURE SENSOR
114 UREA WATER PRESSURE SENSOR
115 REVERTING VALVE
119 SCR SENSOR
124 TANK HEATER VALVE
AMBIENT TEMPERATURE
FIG. 3
301 ARE RESPECTIVE TEMPERATURE DIFFERENCES BETWEEN ENGINE COOLING WATER TEMPERATURE, AMBIENT TEMPERATURE, AND FUEL TEMPERATURE LESS THAN OR EQUAL TO PREDETERMINED THRESHOLD VALUE?
302 IS ENGINE COOLING WATER TEMPERATURE IN PREDETERMINED RANGE?
303 ALLOW DIAGNOSIS
FIG. 4
400 IS THERE NO ABNORMALITY IN CAN DATA, LEVEL SENSOR, AND TEMPERATURE SENSOR CIRCUIT?
401 IS BATTERY VOLTAGE IN PREDETERMINED RANGE?
402 IS LAPSE TIME AFTER ENGINE STARTING IN PREDETERMINED RANGE?
403 IS COLD START CONDITION SATISFIED AS A RESULT OF DETERMINATION BY COLD START CONDITION DETERMINATION UNIT?
404 IS TEMPERATURE DIFFERENCE BETWEEN UREA WATER TEMPERATURE AND AMBIENT TEMPERATURE IN PREDETERMINED RANGE?
405 SENSOR NORMALITY
406 SENSOR FAILURE

The invention claimed is:

1. A competence diagnosis system for a urea water temperature sensor comprising a competence diagnosis unit that diagnoses a failure of the urea water temperature sensor provided in a urea tank by comparing a temperature of urea water measured by the urea water temperature sensor with an ambient temperature,
characterized in that the competence diagnosis system for a urea water temperature sensor comprises a cold start condition determination unit that obtains a difference between an engine cooling water temperature and an ambient temperature, a difference between an engine cooling water temperature and a fuel temperature, and a difference between an ambient temperature and a fuel temperature by using an engine cooling water temperature, an ambient temperature, and a fuel temperature measured immediately after engine starting, and allows a diagnosis by the competence diagnosis unit when the temperature differences are less than or equal to a predetermined threshold value.

2. The competence diagnosis system for a urea water temperature sensor according to claim 1, wherein the cold start condition determination unit allows the diagnosis by the competence diagnosis unit when the engine cooling water temperature is in a predetermined range.

3. The competence diagnosis system for a urea water temperature sensor according to claim 2, wherein minimum values among temperatures measured after the engine starting are used as the engine cooling water temperature and the ambient temperature.

4. The competence diagnosis system for a urea water temperature sensor according to claim 1, wherein minimum values among temperatures measured after the engine starting are used as the engine cooling water temperature and the ambient temperature.

* * * * *